Dec. 30, 1969                R. HEINTZ                    3,486,660
              METHOD AND APPARATUS FOR REGULATING THE
                       FLOW OF MOLTEN METAL
Filed Oct. 5, 1966                                2 Sheets-Sheet 2
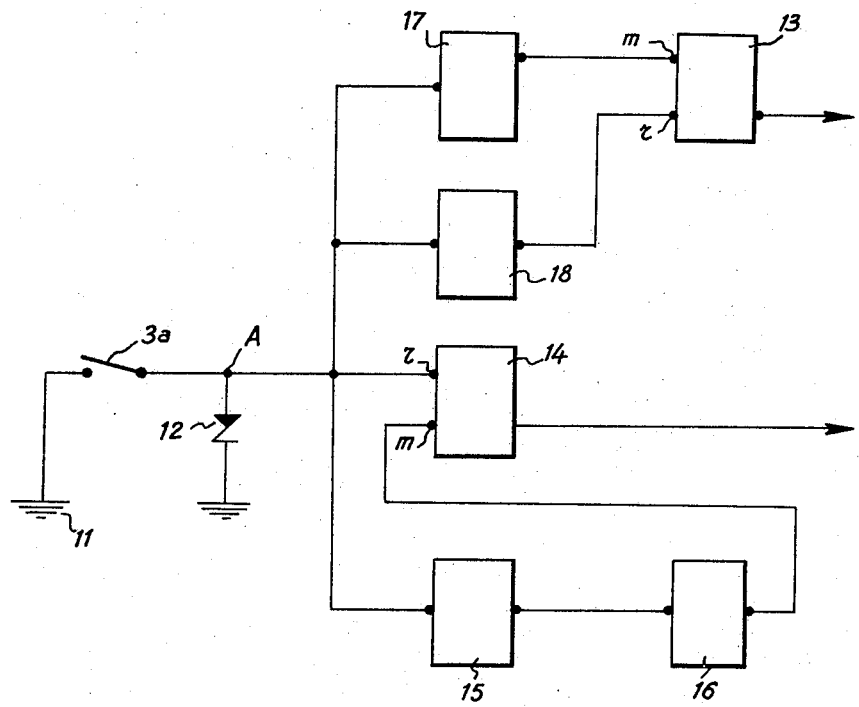
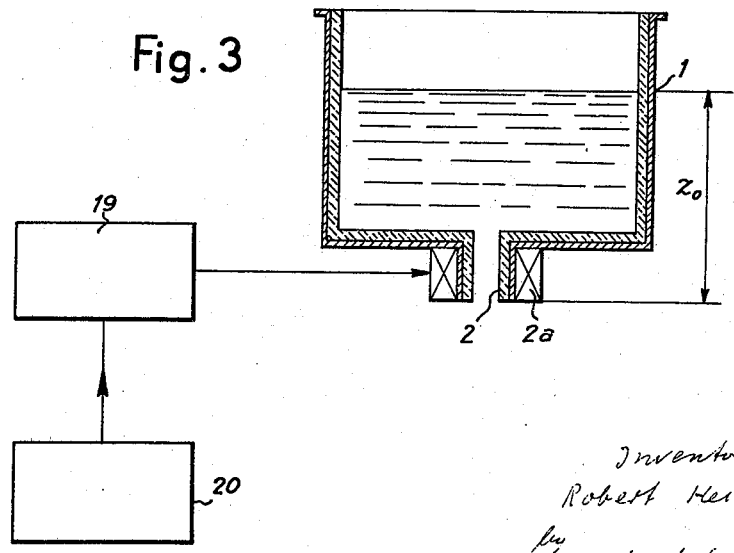
Inventor
Robert Heintz
by Michael S. Striker
Attorney 3,486,660
Patented Dec. 30, 1969

3,486,660
METHOD AND APPARATUS FOR REGULATING THE FLOW OF MOLTEN METAL
Robert Heintz, Metz, France, assignor to Institut de Recherches de la Siderurgie Francaise, Saint Germain-en-Laye, France
Filed Oct. 5, 1966, Ser. No. 584,483
Claims priority, application France, Oct. 5, 1965, 33,730
Int. Cl. G01f *11/00*
U.S. Cl. 222—1                                   16 Claims

ABSTRACT OF THE DISCLOSURE

A method of regulating the rate of flow of molten metal through an orifice provided in the lower zone of a metallurgical vessel having electromagnetic means exerting a force for regulating said rate of flow, comprising varying said force as a function of the height of the body of molten metal in the vessel in accordance with a predetermined pattern so that the rate of metal outflow remains constant.

---

The present invention relates to a method and apparatus for regulating the outflow of molten metal through the orifice of a metallurgical vessel, for example a casting ladle or a pouring box, wherein the level of a bath of molten metal varies and liquid metal issues from an orifice, for example a nozzle, located in the lowermost zone of the ladle. More particularly, the invention relates to a method and apparatus wherein the outflow of molten metal is regulated by electromagnetic means.

It is an object of the present invention to provide a method and apparatus for effecting outflow of molten metal at a constant rate despite the fact that the level of molten metal in the vessel varies, by full consideration of the wear upon refractory material of the components which are used in the apparatus, and also by full consideration of certain secondary factors or parameters which can affect the outflow of molten metal.

A main feature of my invention resides in the provision of a method of regulating the rate of outflow of molten metal through an orifice located in the lower zone of a metallurgical vessel, provided with electromagnetic means exerting a force for regulating said rate of flow, said method comprising varying said force as a function of the height of the liquid column in the vessel in accordance with a predetermined pattern to thus insure the stream issues from the orifice at a constant rate.

In accordance with another feature of the invention, forces exerted upon the stream of molten metal by the electromagnetic means are varied as a function of changes in the liquid level and by further considering a corrective factor varying as a function of time and which is determined in advance by experimentation and compensates for such potential changes in the rate of outflow which might be due to wear upon the refractory material that comes in contact with molten metal.

In accordance with another feature of the novel method, force exerted upon the stream of outflowing molten metal may be varied by regulating the electric current or the voltage applied to the induction coils of the electromagnetic means.

In accordance with still another feature of the novel method, an automatic computer is used to give the basic electric signal which is indicative of the afore-mentioned predetermined relationship between the electromagnetic force and the height of the liquid column in the vessel in accordance with a predetermined pattern. In producing such signal, one might also consider the wear upon the refractory parts.

It is also within the purview of the above outlined method to continuously produce a second electric signal which indicates the height of the column of molten metal in the vessel, and to feed such second signal into the automatic computer which gives the basic signal.

In accordance with a modification of the above outlined method which does not involve actual measurement of the height of the column of molten metal in the vessel and which can be resorted to when the contents of the vessel are being evacuated without replenishing the supply of molten metal, the electromagnetic force exerted upon the stream of outflowing metal can be varied as a function of time in accordance with a predetermined pattern which latter is indicative of variations in the level of the metallic bath as a function of time. This last mentioned modification of my method may comprise controlling the force of the electromagnetic means by resorting to an automatic computer which furnishes an electric signal indicative of the aforementioned predetermined relationship as a function of time and by considering the initial height of the liquid column in the vessel at the time the outflow begins and, if desired or necessary, also the temperature of molten metal.

The apparatus of the present invention comprises a metallurgical vessel which can receive a bath of molten metal and has an orifice in the lower zone thereof to allow for escape of a stream of molten metal. The apparatus further comprises electromagnetic outflow regulating pumping or breaking means arranged to exert upon the stream of outflowing metal a variable force, automatic computer means for producing a first or basic electric signal which is variable in dependency on the height of the column of liquid metal in the vessel and in accordance with a predetermined pattern, and means for controlling the electromagnetic means to vary the force exerted upon the stream of outflowing metal in accordance with the modified basic signal.

The automatic computer may be an analog computer arranged to furnish a signal which may be expressed by the equation $$\Delta p = A\{Z_o - \int[[kf(t)\int f(t)] - 2\sqrt{Z_o}]dt\}$$

wherein
$Z_o$ is the combined initial height of the column of molten metal in the orifice or nozzle and vessel,
$A$ is a constant for the particular metal,
$k$ is a constant for the particular vessel,
$f(t)$ is a function of time for a given initial diameter of the nozzle and for a given type of refractory lining surrounding such orifice.

Alternatively, the automatic computer may be an analog computer capable of continuously solving the equation
$$v = f(h)$$

wherein $v$ is a function of the momentary height $h$ of the bath of molten metal in the vessel.

The height of molten metal in the vessel can be measured by a gauge which may include a current-conducting electrode adapted to move vertically up and down away from and toward the liquid level in the vessel in response to operation of a prime mover controllable in such a way that the electrode is caused to descend when out of contact with the bath, that the electrode comes to a halt when placed in contact with the bath, and that the electrode rises if the duration of contact with the bath exceeds an interval of predetermined length.

An analog integrator which can produce a signal as a function of time to account for the wear upon the gauge may be connected between the computer and the means for measuring the height of the bath of molten metal in the vessel. The aforementioned gauge which includes an electrode can be provided with delay means to avoid abrupt or premature movements of the electrode.

It is well known that, if the pressure above the liquid level remains constant, the rate of outflow of liquid metal through an orifice or nozzle communicating with the bottom zone of the interior of a metallurgical vessel will vary considerably in response to changes in the height of the mass of molten metal in the vessel. This is normally the case when molten metal is discharged from casting ladles. It is often highly desirable, for instance in continuous casting, to insure evacuation of molten metal at a constant rate, irrespective of fluctuations in the liquid level and even if all of the molten metal is to be evacuated from the vessel. This is achieved by the advent of the present invention which provides a method and apparatus for insuring evacuation of molten metal at a constant rate irrespective of the momentary liquid level in the vessel. The stream of outflowing metal is subjected to the action of a variable pumping force which is produced by electromagnetic means and compensates for variations in hydrostatic pressure due to changes in distance between the orifice and the liquid level in the vessel.

The exact level of molten metal in the vessel can be determined by known detector means without contacting the bath, and such determination can be used to calculate the distance between the liquid level and the orifice. For example, one can resort to electromagnetic or sonic reflection type echo depth finders, to reflection of electromagnetic or light waves (including the use of laser beams), to probe using variable capacitors, and others. Such level indicators are not as yet in actual use.

It is also possible, in accordance with the present invention, to determine or locate the exact level of the exposed surface of a bath of molten metal by means of a conductive refractory electrode, for example of CSi. The electrode can be moved by a reversible electric motor or by an analogous prime mover which tends to maintain the electrode in continuous contact with the exposed surface of molten metal. The position of the electrode can be tracked by a potentiometer or by an analogous electromechanical transmitting device which produces an appropriate signal to indicate the position of the liquid level. Apparatus utilizing such electrodes will furnish accurate signals if they are provided with means for transmitting to the computer a corrective signal to account for wear upon the electrode such as will inevitably develop in response to contact between the electrode and molten metal. This corrective signal can be produced by an analog integrator as a function of total evacuation time or as a function of the time during which the electrode is in actual contact with liquid metal. In both instances, the integration constants will be determined by experimentation.

In the simplest case of application of the process, the vessel being filled, then emptied continuously and without addition of more molten metal, and with ladle dimensions and nozzle type and nature of refractory remaining constant, it is possible to establish a relation defining the metal level in the vessel and the time beginning with the moment of start of teeming. In such an operation it is not necessary to actually measure the level, and the force applied to the stream of outflowing metal can be varied as defined in the previously noted relationship. A simple analog computer can be used to produce electric signals which are indicative of changes in the liquid level as a function of time. the parameters which control the operation of such computer include the design characteristics of the vessel and the initial level of liquid at the start of an operation.

An important advantage of a method or apparatus which actually determines the liquid level in the vessel is that the rate of metal outflow will be constant even if the liquid level descends irregularly, i.e., at an unpredictable rate, and also if the liquid level rises. This is especially often the case in the use of tundishes or pouring boxes fed discontinuously but from which the metal issues continuously.

Of course, the accuracy of the operation depends on the stability of certain parameters which are at the present considered as being fixed or unchangeable. Such parameters include in particular the internal diameter of the nozzle which defines the orifice and the temperature of molten metal. In case of molten steel, it is simply impossible to assume that the nozzle will be subjected to no wear. One can rely on the law of linear variation of the actual orifice diameter as a function of time as suggested by Martin and Taylor. It is also possible to feed into the computer a correction factor which is proportional to the time of outflow and is furnished by an analog integrator. If the temperature of metal changes considerably and causes substantial variations in viscosity, one can account for such changes in temperature by introducing into the computer a correction factor depending on temperature measurement which can be carried out in any known way, such as by a thermocouple, an optical pyrometer or the like.

Since the outflow of molten metal is rather slow, it is not necessary to use relatively bulky and complex numerical computers. Simple electrical or electromagnetic analog computers are preferred at this time because of lower cost and more rugged construction.

An apparatus which embodies the present invention can also operate in the following way: the electro-magnetic pumping means will exert a force which balances the hydrostatic pressure prior to outflow of molten metal; closing of an electric switch causes a reversal in the direction of electromagnetic force and the outflow begins whereupon the magnitude of the force is controlled in a manner as described above. Upon completion of the evacuation, the direction of the electromagnetic force is reversed again.

Two specific embodiments of the novel apparatus will be described with reference to the accompanying drawings, in which:

FIG. 2 is a diagram of a logical circuit which controls the operation of an electric motor serving to move the electrode; and FIG. 3 is a diagrammatic view of a second apparatus wherein the vessel is refilled only upon complete evacuation of molten metal and wherein the force exerted upon the stream of outflowing metal is a function of time counting from the moment when the evacuation begins.

Figure 1:
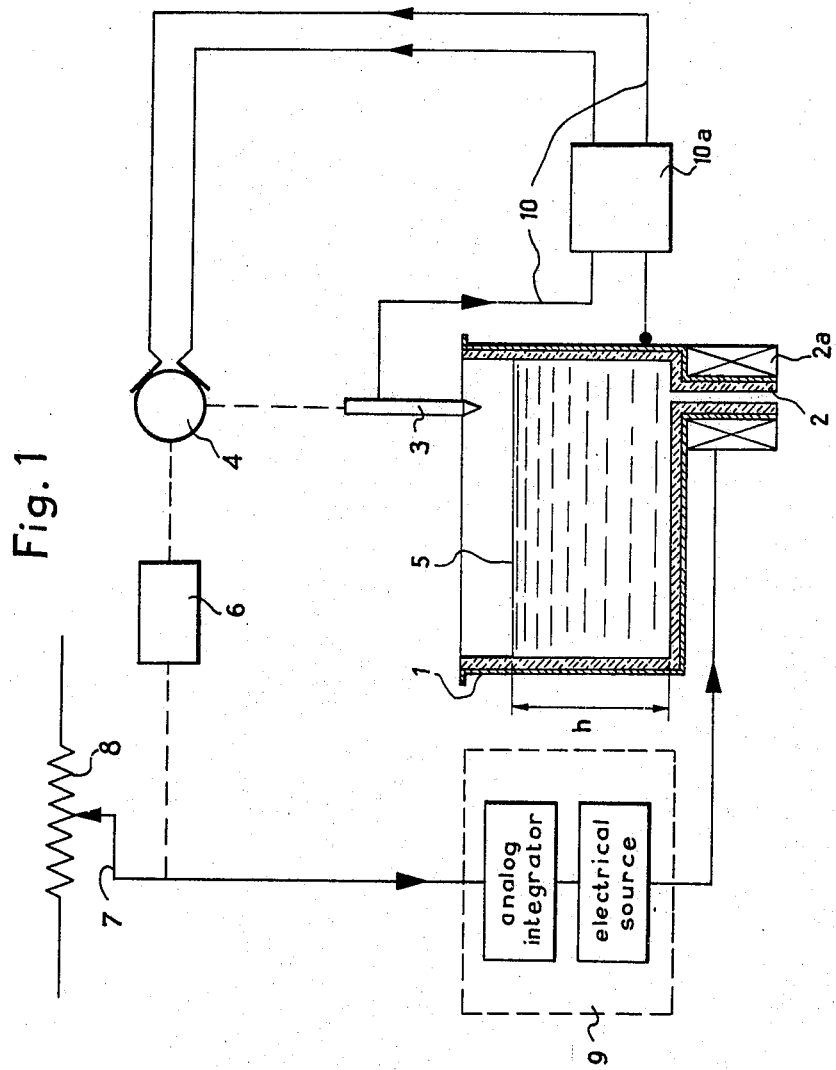
FIG. 1 is a diagrammatic view of an apparatus wherein the exact level of liquid metal which is contained in a metallurgical vessel is determined by an electrode.

Referring first to FIG. 1, there is shown a metallurgical vessel in the form of a ladle 1 containing a bath of molten metal and having a bottom wall provided with a nozzle or outlet 2 defining an orifice for evacuation of molten metal by gravity feed. The nozzle 2 is surrounded by an electromagnet 2a of a known type provided with means for varying the strength of its shifting magnetic field.

A vertically reciprocable electrode 3 is disposed above the liquid level 5 in the ladle 1 and is movable up and down by a reversible electric motor 4. When the electrode descends to a level which is located at the distance $h$ from the bottom wall of the ladle, it completes an electric circuit through the body of molten metal and the completion of such circuit is used to arrest the motor 4.

A reducing gear 6 is driven by the motor 4 and serves to shift the moving contact or slider 7 of a potentiometer 8. The output member of the speed reducer 6 is driven by the output member of the motor 4 and completes one revolution in response to maximum stroke of the electrode 3. Thus, the displacement of the slider 7 is proportional to displacement of the electrode 3. The tension $v$ between the slider 7 and one terminal of the potentiometer 8 is a function of the position of the electrode 3. In other words, and if the tip of the electrode 3 contacts the exposed surface of molten metal, tension $v$ is a function of the height $h$ of the liquid column in the ladle 1. Such tension $v$ is corrected by a tension $v'$ which is indicative of the wear upon the electrode 3. The tension $v'$ can be calculated by an analog integrator accommodated in the box represented at 9 and can be provided with a source of electrical energy in such box.

A logical circuit 10 controls movements of the electrode 3 and includes various units represented diagrammatically at 10$a$ and shown in more detail in FIG. 2. In this illustration, the electrode 3 is indicated schematically by the movable contact of a switch 3$a$ whose fixed contact is grounded through the mass of liquid metal and ladle 1, as at 11. The switch 3$a$ is illustrated in open position, i.e., the electrode 3 is held above the liquid level 5 shown in FIG. 1.

Actual contact between the electrode 3 and liquid metal (closing of the switch 3$a$) will cause a drop to zero of a tension of minus six volts which is normally maintained between the terminals of a Zener diode 12. Thus, the junction A is maintained at $-6$ volts when the switch 3$a$ is open, i.e., when the electrode 3 is out of actual contact with the bath. The tension drops to zero when the switch 3$a$ closes.

The logical circuit of FIG. 2 controls the motor 4 in such a way that the latter can rotate in one direction (to raise the electrode 3) when the switch 3$a$ is closed and that the motor can rotate in the opposite direction (to lower the electrode) when the switch 3$a$ is open.

The motor 4 is started in each direction by a conventional relay (not shown) and each of these relays can be energized by a bistable circuit, for example a bistable multivibrator having two stable conditions of equilibrium. In one condition of equilibrium (hereinafter called the condition R), the respective relay is deenergized and the motor 4 is idle. In the other condition of equilibrium (hereinafter called M), the multivibrator energizes the respective relay and the circuit of the motor 4 is completed so that the motor rotates in a predetermined direction. Suitable blocking contacts prevent simultaneous energization of both relays.

FIG. 2 shows a first or lifting bistable circuit 13 which controls upward movement of the electrode 3, and a second or lowering bistable circuit 14 which controls downward movement of the electrode. Each of these circuits has a first input $m$ which must receive a positive signal to oscillate the respective circuit in the condition M, and a second input $r$ which must receive a positive signal to oscillate the respective circuit in the condition R. Negative signals will have no effect upon the circuits 13 and 14.

The operation is as follows:

It is assumed that the electrode 3 does not contact the bath of molten metal. Such situation will arise, for example, when the electrode 3 is raised to its uppermost position prior to refilling of the ladle 1. Upward movement of the electrode can be initiated independently of the automatic control system by energizing the relay which starts the motor 4 in a sense to drive the electrode upwardly. The control system is arranged in such a way that, when tension is applied thereto, the bistable circuits 13 and 14 are maintained in the condition R and that the energizing potential of the Zener diode 12 appears with a certain delay; at such moment, the junction A is maintained at $-6$ volts which will produce a negative step voltage at the input of an inverter 15 whereby the latter sends a positive step voltage to a monovibrator or monostable lowering circuit 16. The circuit 16 emits a positive signal with a delay $\tau_1$. Such positive signal is applied to the input $m$ of the lowering bistable circuit 14 which is then caused to oscillate in the condition M and to effect downward movement of the electrode 3. The delay $\tau_1$ is desirable to avoid abrupt changes in direction of rotation of the motor 4. A negative signal remains without effect upon the input $r$ of the circuit 14.

When the electrode 3 comes in contact with the bath, tension at the junction A suddenly drops to zero and a positive step voltage is applied to the input $r$ of the bistable circuit 14 which begins to oscillate in the condition R and arrests the motor 4. The inverter 15 emits a negative step voltage which is without effect on the monostable circuit 16. The positive step voltage generated in response to closing of switch 3$a$ is also applied to the input of a monostable raising circuit 17 and to the input of a continuous current inverter 18. The circuit 17 emits a positive step voltage which is applied to the input $m$ of the bistable circuit 13 with a delay $\tau_2$. The inverter 18 applies an ineffective negative step voltage to the input $r$ of the same circuit 13 and maintains it at zero potential while the switch 3$a$ remains closed. If, following the delay $\tau_2$, the switch 3$a$ opens again, tension at the junction A is again $-6$ volts and the inverter 18 applies a tension of $+6$ volts to the input $r$ of the bistable circuit 13 which is thereby prevented from oscillating in the condition M. However, if the switch 3$a$ remains closed after the delay $\tau_2$, the bistable circuit 13 oscillates in the condition M to start the motor 4 in a sense to move the electrode 3 upwardly. The delay $\tau_2$ is necessary to avoid premature lifting of the electrode 3 at the very moment when the latter reaches the bath while the level 5 continues to descend. Longer-lasting contact between the bath and electrode 3 will indicate that the outflow is terminated or that the supply of molten metal has been replenished which latter necessitates upward movement of the electrode.

The electrode need not be raised if the outflow of molten metal is terminated. At the very moment when the switch 3$a$ opens in response to descent of the liquid level 5, a negative tension develops at the junction A and the monostable circuit 16 emits a positive signal with a delay $\tau_1$ to cause oscillation of the bistable circuit 14 in the condition M and to bring about renewed descent of the electrode 3 so that the latter follows the level 5 toward the bottom wall of the ladle 1.

If the switch 3$a$ remains closed after the delay $\tau_2$, the electrode 3 will be caused to move upwardly. When the switch 3$a$ thereupon opens, negative signal reappears at the junction A but this has no effect upon the monostable circuit 17. The inverter 18 transforms such negative signal into a positive signal which is applied to the input $r$ of the bistable circuit 13 to place the latter into the condition R and to thus terminate upward movement of the electrode 3. The negative signal produced on opening of the switch 3$a$ is also transmitted to the inverter 15 and will cause renewed lowering of the electrode after a delay $\tau_1$ until the electrode returns into contact with the bath. The delay $\tau_1$ is needed to avoid abrupt changes in the direction of rotation of the motor 4.

The operation is then repeated in the above-described manner.

FIG. 3 shows an apparatus wherein a ladle 1 contains a bath of molten metal which is simply evacuated at a constant rate and wherein the electromagnet 2$a$ surrounding the nozzle 2 is controlled by a signal which is a function of time starting with the moment when the evacuation of the ladle begins. The electromagnet 2$a$ is controlled by an inverter piloted by an internal oscillator which supplies current at fixed voltage but at variable frequency to a three phase winding of the electromagnet 2$a$. For such purpose, the oscillator of the inverter 19 converts into variable frequency an analog signal of variable tension furnished by a computer 20 and representing the force or pressure to be exerted by the electromagnet 2$a$ at the instant $t$ upon the stream of molten metal which flows through the nozzle 2.

Such force can be expressed by the equation:

$$\Delta p = \rho g \left\{ Z_o - \int \left[ \left[ g \frac{\pi^2}{1652} (\Phi_o + \lambda t)^2 \int (\Phi_o + \lambda t)^2 \right] - 2\sqrt{Z_o} \right] dt \right\}$$

wherein
$\rho$ is the specific gravity of metal
$g$ is acceleration due to gravity,
$Z_o$ is the initial height of the metal in ladle 1 and nozzle 2,
$\Phi_o$ is the initial internal diameter of the nozzle 2,
$\lambda$ is a constant depending on refractory material at a given temperature,
$t$ is the time elapsed during outflow of metal from the ladle 1.

The value of $t$ will be zero when the height of metal is $Z_o$.

By substituting $A$ for $\rho g$, $k$ for $g \frac{\pi^2}{1652}$, and $f(t)$ for $(\Phi_o + \lambda t)^2$ one obtains $$\Delta p = A \left\{ Z_o - \int \left[ \left[ kf(t) \int f(t) \right] - 2\sqrt{Z_o} \right] dt \right\}$$

It will be readily understood that the above described examples are not to be construed in a limitative sense and that the invention is susceptible of many additional modification. For example, in a given ladle with a given nozzle, a curve indicating volumetric discharge of metal can be plotted as a function of evacuation time and such curve can be continuously corrected by a computer. One then determines variations in the level of molten metal as a function of the corrected curve and regulates the outflow in such a way that it remains constant.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. A method of regulating the rate of outflow of molten metal through an orifice provided in the lower zone of a metallurgical vessel constituting the supply vessel and having electromagnetic means exerting a force for regulating said rate of flow, said method comprising continuously determining the height of the body of molten metal in said supply vessel and varying said force as a function of said height determination in accordance with a predetermined pattern so that the rate of metal outflow remains constant.

2. A method as set forth in claim 1, further comprising the step of additionally varying said force in accordance with a correction factor which is a function of time and is determined in advance to account for wear on refractory material that comes in contact with molten metal.

3. A method as set forth in claim 1, wherein said force is produced by electromagnetic means provided in the region of said orifice and having induction coils, said force varying step including changing the electric current in said coils.

4. A method as set forth in claim 2, wherein said force is produced by electromagnetic means provided in the region of said orifice and having induction coils, said force varying step including changing the voltage in said coils.

5. A method as set forth in claim 1, wherein the step of varying said force comprises producing a basic electric signal as a function of the height of said body of molten metal, automatically modifying such signal by computer action, and utilizing such modified signal to change said force.

6. A method as set forth in claim 5, wherein said basic signal is modified by a correction factor to account for wear on refractory material which comes in contact with molten metal.

7. A method of regulating the rate of flow of molten metal through an orifice provided in the lower zone of a metallurgical vessel having electromagnetic means exerting a force for regulating said rate of flow comprising producing a basic electric signal as a function of the height of said body of molten metal, continuously measuring the actual height of the said body of molten metal, producing a second signal which is indicative of the results of such measurement, and utilizing said second signal to modify said basic signal.

8. A method as set forth in claim 2, wherein said body of molten metal is evacuated without refilling of the vessel and continuously so that the level of molten metal decreases from a maximum level to zero, said step of varying said force comprising changing the magnitude of the force as a function of time beginning with the start of metal outflow and in accordance with a predetermined pattern which is indicative of changes in the level of molten metal.

9. A method as set forth in claim 8, wherein the variation of said force is controlled by automatic computer action which produces an electric signal characteristic of said predetermined pattern by further considering the initial level of metal in the vessel.

10. A method as set forth in claim 9, further comprising the step of modifying said signal in accordance with changes in temperature of molten metal.

11. Apparatus for regulating the rate of flow of molten metal through an orifice provided in the lower zone of a metallurgical vessel having electromagnetic means adapted to apply a variable electromagnetic force to the stream of molten metal to regulate said rate of flow, the said apparatus comprising automatic computer means connected with said electromagnetic means for changing the magnitude of such force as a function of the height of the body of molten metal in said vessel and in accordance with a predetermined pattern so that the rate of metal outflow remains constant, said vessel comprising a downwardly extending nozzle having a refractory lining defining said orifice and said computer means comprising an analog computer arranged to transmit to said electromagnet means a signal:

$$\Delta p = A \left\{ Z_o - \int \left[ \left[ kf(t) \int f(t) \right] - 2\sqrt{Z_o} \right] dt \right\}$$

wherein $Z_o$ is the combined initial height of the body of molten metal in said vessel and said nozzle, $A$ is a constant for the particular molten metal, $k$ is a constant for said vessel, $f(t)$ is a function of time for the initial internal diameter of said nozzle and a given refractory lining and wherein $\Delta p$ is the force exerted by said electromagnetic means for regulating said rate of flow.

12. Apparatus for regulating the rate of flow of molten metal through an orifice provided in the lower zone of a metallurgical vessel having electromagnetic means adapted to apply a variable electromagnetic force to the stream of molten metal to regulate said rate of flow, comprising control means including analog computer means arranged to continuously solve the equation $$v = f(h)$$

wherein $v$ is a function of the momentary height $h$ of the body of molten metal in said vessel, said control means being connected with said electromagnetic means for changing the magnitude of said force as a function of the height of the body of molten metal in said vessel and in accordance with a predetermined pattern so that the rate of metal outflow remains constant.

13. Apparatus for regulating the rate of flow of molten metal through an orifice provided in the lower zone of a metallurgical vessel having electromagnetic means adapted to apply a variable electromagnetic force to the stream of molten metal to regulate said rate of flow comprising control means connected with said electromagnetic means and including gauge means for continuously determining the actual height of said body of molten metal in said vessel and automatic computer means forming part of said control means for changing the magnitude of said force as a function of the height of the body of molten metal determined by said gauge means and in accordance with a predetermined pattern so that the rate of metal outflow remains constant.

14. Apparatus as set forth in claim 13, wherein said gauge means comprises a current-conducting electrode movable up and down above the body of molten metal in said vessel, a prime mover for moving said electrode up and down, means for operating said prime mover to move said electrode downwardly when the electrode is out of contact with molten metal, to arrest the electrode when in contact with molten metal, and to raise the electrode with a predetermined delay on continuing contact with molten metal, and means for transmitting to said computer means a basic signal indicative of the position of said electrode.

15. Apparatus as set forth in claim 14, further comprising an analog integrator connected between said gauge means and said computer means to transmit to said computer means a second signal indicative of the wear upon said electrode on contact with molten metal, said computer means being arranged to modify said basic signal in accordance with said second signal so that said force is varied by consideration of wear upon said electrode.

16. Apparatus as set forth in claim 14, wherein the means for operating said prime mover comprises time delay means to prevent abrupt and premature movements of said electrode.

References Cited

UNITED STATES PATENTS 2,743,492   5/1956   Easton _____ 164—281 X

FOREIGN PATENTS 226,894   4/1963   Austria.
967,657   8/1964   Great Britain.

SAMUEL F. COLEMAN, Primary Examiner

U.S. Cl. X.R

164—281; 222—54, 64, 76, 504